Feb. 15, 1955  V. A. SKINNER  2,702,007
CONTROL FOR HYDRODYNAMIC MACHINES
Filed Nov. 17, 1949  2 Sheets-Sheet 1

INVENTOR
VINCENT A. SKINNER
BY
Wesley P. Merrill
ATTORNEY

Feb. 15, 1955 V. A. SKINNER 2,702,007
CONTROL FOR HYDRODYNAMIC MACHINES
Filed Nov. 17, 1949 2 Sheets-Sheet 2
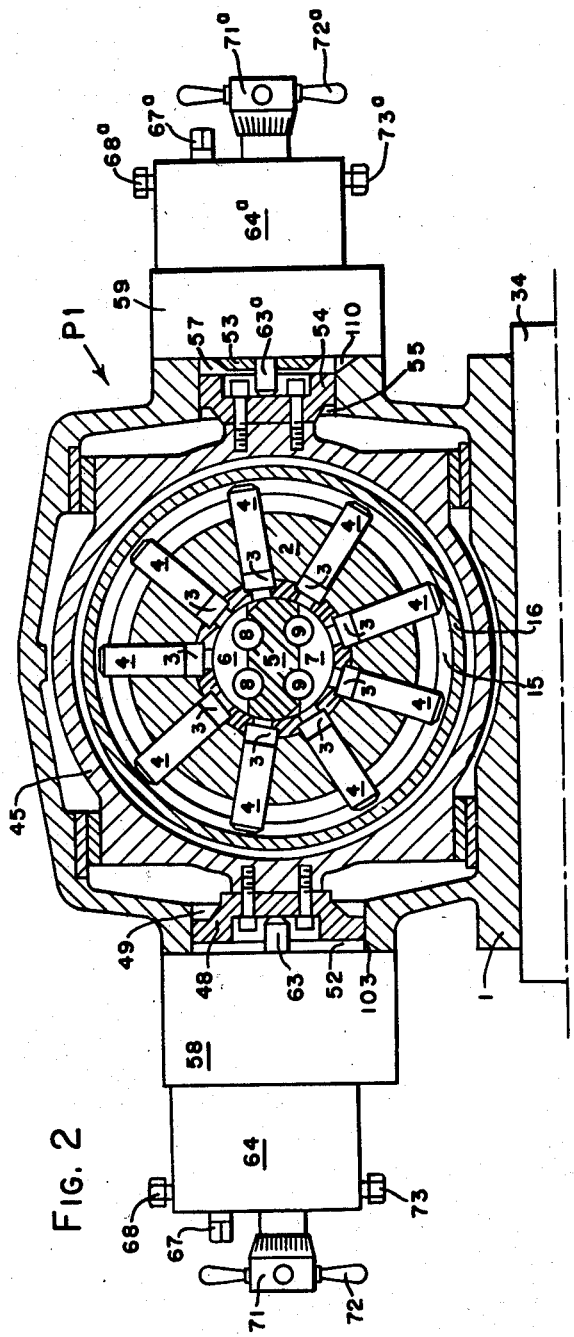
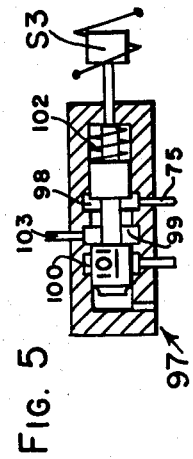
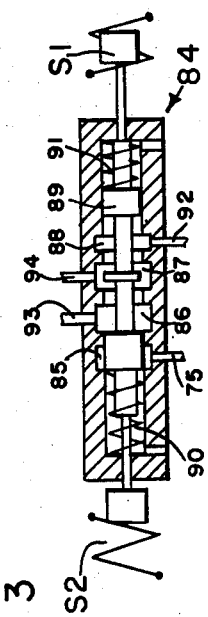
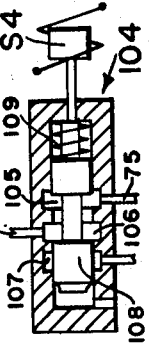
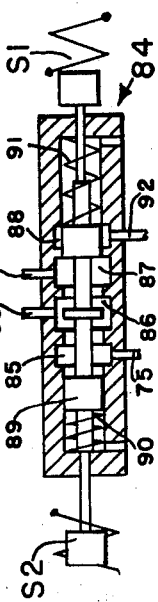
INVENTOR
VINCENT A. SKINNER
BY
ATTORNEY

United States Patent Office 2,702,007
Patented Feb. 15, 1955

2,702,007

CONTROL FOR HYDRODYNAMIC MACHINES

Vincent Allen Skinner, Arden Park, Stockport, England, assignor to The Oilgear Company, Milwaukee, Wis., a corporation of Wisconsin Application November 17, 1949, Serial No. 127,909

16 Claims. (Cl. 103—161)

This invention relates to controls for hydrodynamic machines of the type having a displacement varying member which is shiftable toward and from a zero displacement position to vary the displacement of the machine. Such a machine will function as a pump when driven mechanically or will function as a motor when supplied with motive liquid. In order to simplify the description, the invention will be explained as being applied to a pump but it is to be understood that it may be as readily applied to a hydraulic motor.

A pump provided with a control embodying the invention is particularly adapted for energizing a hydraulically driven machine having at least one hydraulic motor which should be operated at different speeds during a single cycle of operations and/or at least two hydraulic motors which must be operated in sequence and which have different volumetric capacities or are to be operated at different speeds.

The invention has as its primary object to provide a control which will shift the displacement varying member of a hydrodynamic machine between a zero displacement position and a plurality of predetermined positions on each side of the zero displacement position.

A pump provided with a control embodying the invention has the advantage that it can automatically vary its rate of delivery between zero and a plurality of preselected rates in opposite directions of delivery.

Other objects and advantages will appear from the following description of the embodiment of the invention shown schematically in the accompanying drawings in which the views are as follows:

Fig. 2 is a transverse section through a pump which is provided with the control shown in Fig. 1, the control cylinders being shown in full.

Figs. 3, 4, 5 and 6 are views showing valves with the valve members or plungers thereof in positions different from those shown in Fig. 1.

Figure 1:
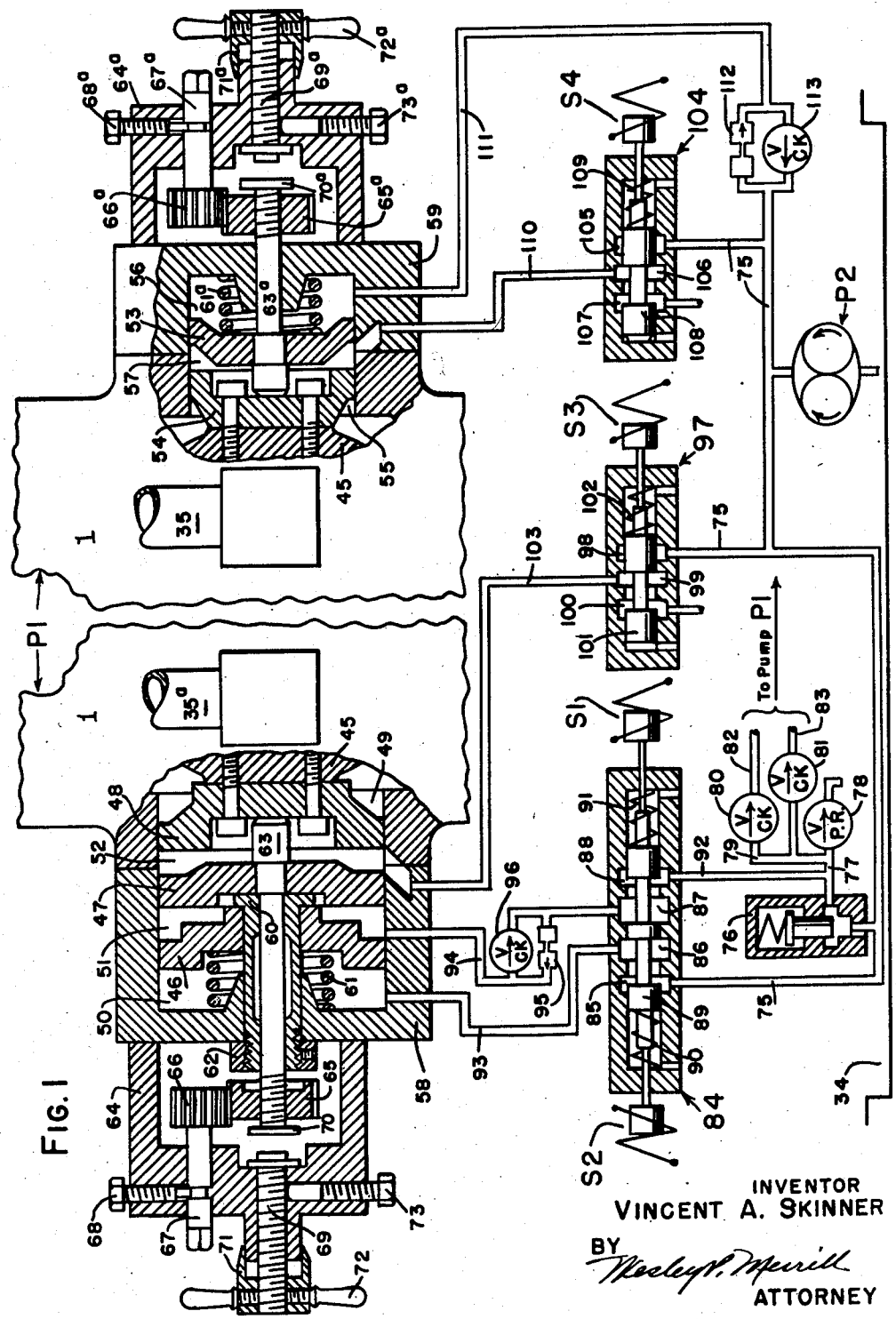
Fig. 1 is a circuit diagram illustrating a control in which the invention is embodied.

A control embodying the invention may be applied to any hydrodynamic machine having a member which may be shifted in opposite directions selectively from and toward a neutral position to vary the displacement of the machine. For the purpose of illustration, the invention has been shown applied to a rolling piston pump P1 of the general type illustrated and described in Patent No. 2,074,068 to which reference may be had for the general arrangement of the parts.

As shown in Fig. 2, the pumping mechanism is arranged within a pump case 1 and includes a rotatable cylinder barrel 2 having a plurality of cylinders 3 arranged radially therein and a piston 4 fitted in each cylinder. The pistons and cylinders are arranged in a plurality of circular rows of which only one row appears in the drawing. Cylinder barrel 2 is journaled upon a stationary valve shaft or pintle 5 having formed therein two diametrically opposed ports 6 and 7 with which each cylinder communicates alternately during rotation of cylinder barrel 2. Pintle 5 also has formed therein two axial passages 8 which communicate with port 6 and two axial passages 9 which communicate with port 7.

The pintle has its rear end portion rigidly secured in the rear wall of the pump case and the pintle passages extend rearward from the pintle ports and then extend radially outward for connection to an external circuit as shown in the above patent. In the present instance, passages 8 and 9 communicate, respectively, with the pipes 35 and 35A shown in Fig. 1.

Pump P1 has been shown in Fig. 2 as having its case 1 mounted upon a reservoir 34 of which only a portion appears in the drawing. In order that pump P1 may draw liquid from or discharge liquid into reservoir 34 to compensate for any difference between the volume of liquid discharged by the pump into a circuit and the volume of liquid returned to it from the circuit during the time the pump is discharging liquid in either direciton, passages 8 and 9 are connected to reservoir 34 through an automatic differential valve according to common practice. The differential valve has not been illustrated because the use of such valves is well known and Patent No. 2,114,005 discloses such a valve and the manner in which it can be applied to pump P1.

The outer ends of pistons 4 are beveled and in contact with an inclined surface 15 on a rotatable annular thrust member 16 which is arranged within a displacement varying member or slideblock 45 which is slidably fitted in case 1 and restrained from vertical movement thereby. The thrust member is rotatably supported and restrained from axial movement by the slideblock and the slideblock is restrained from axial movement as shown in Patent No. 2,074,068.

The arrangement is such that, when slideblock 45 is in its neutral or zero displacement position as shown in Fig. 2, thrust member 16 will be concentric with cylinder barrel 2 and no reciprocation at pistons 4 will occur in response to rotation of cylinder barrel 2. When cylinder barrel 2 is rotated in a clockwise direction and slideblock 45 is shifted from its neutral position toward the right in respect to Fig. 2, the pistons 4 above the horizontal centerline of pintle 5 will move progressively outward and will draw liquid into their cylinders through passages 8 and port 6, and the pistons 4 below the horizontal centerline of pintle 5 will be forced progressively inward and will eject liquid from their cylinders through port 7 and passage 9. When cylinder barrel 2 is rotated in a clockwise direction and slideblock 4 is shifted from its neutral position toward the left in respect to Fig. 2, the pistons 4 below the horizontal centerline of pintle 5 will move progressively outward and will draw liquid into their cylinders through passages 9 and ports 7, and the pistons 4 above the horizontal centerline of pintle 5 will be forced progressively inward and will eject liquid from their cylinders through ports 6 and passages 8. Pump P1 will discharge liquid in a direction and at a rate determined by the direction and distance slideblock 45 is moved from its neutral position.

Pump P1 has been shown in Fig. 1 as being provided with a control which includes two sets of servo-motors arranged upon opposite sides of the pump case. One set includes three pistons 46, 47 and 48 which are fitted in a cylinder 49 and which divide cylinder 49 into three pressure chambers 50, 51 and 52. The other set of servo-motors includes two pistons 53 and 54 which are fitted in a cylinder 55 and which divide cylinder 55 into two pressure chambers 56 and 57. Cylinders 49 and 55 have been shown as being formed in part by portions of the pump case and in part by servo-motor housings 58 and 59, respectively, which are arranged upon opposite sides of the pump case.

Cylinder 49 and pistons 46, 47 and 48 are considerably larger in diameter than cylinder 55 and pistons 53 and 54 so that when a piston in cylinder 49 and a piston in cylinder 55 are both acted upon by liquid at the same pressure, such as 180 p. s. i., the piston in cylinder 49 will be capable of exerting sufficient force to move slide block 45 toward the right against the force exerted by the piston in cylinder 55.

Piston 46 is arranged upon a shouldered sleeve 60 which extends through and has a close sliding fit in the end wall of housing 58. The inner face of piston 46 is normally held in contact with the shoulder on sleeve 60 by a spring 61 which is arranged around sleeve 60 between the other face of piston 46 and the end wall of housing 58. The outer end of sleeve 60 has threaded thereon a nut 62 which initially is so adjusted that it engages the end wall of housing 58 when slide block 45 is in its neutral position and then it is fixed in adjusted position as by means of a suitable set screw.

Piston 48 has its inner face in contact with slide block 45 and it preferably is bolted thereto. The other face of piston 48 is engaged by the enlarged inner end of a control rod 63 which extends through and has a close sliding fit in sleeve 60. Piston 47 is arranged upon rod 63 between the enlarged inner end thereof and the shouldered inner end of sleeve 60.

Control rod 63 extends beyond sleeve 60 and into a cap 64 which is fastened to the end wall of housing 58 and encloses a part of the mechanism for adjusting the pump. The outer portion of rod 63 has threaded thereon an adjusting pinion 65 which is adapted to engage nut 62 and thereby function as a stop to limit the distance that piston 47 can move slide block 45 toward the right when liquid under pressure is supplied to pressure chamber 51.

Pinion 65 meshes with a gear 66 fixed to a shaft 67 which is journaled in the end wall of cap 64 and is restrained from axial movement by a set screw 68 which is threaded through the end wall of cap 64 and extends into a cannelure formed in shaft 67. The outer end of shaft 67 is squared so that it and gear 66 can be rotated to cause pinion 65 to rotate and to move along rod 63 to vary the distance between it and nut 62 and thereby vary the distance that piston 47 can move slide block 45 beyond its neutral position.

The maximum distance that slide blocks 45 can be moved toward the left is determined by an adjusting screw 69 which is threaded through the end of cap 64 and limits the distance that control rod 63 can move toward the left. The outer end of rod 63 may be adapted to engage the inner end of screw 69 but preferably it has an abutment 70 fastened thereto in any suitable manner. Screw 69 is provided on its outer end with means for rotating it, such as a head 71 having spokes 72 fixed thereto. Head 71 ordinarily is provided with graduations for indicating the adjustment of the pump. Screw 69 may be fastened in adjusted positions by means of a set screw 73.

Piston 54 has its inner face in contact with slide block 45 and it preferably is bolted thereto. The outer face of piston 54 is engaged by the enlarged inner end of a control rod 63ª which extends through and has a close sliding fit in the end wall of housing 59. Piston 53 is arranged upon control rod 63ª and is held in contact with the enlarged end thereof by a spring 61ª arranged around control rod 63ª between piston 53 and the end wall of housing 59. Control rod 63ª extends into a cap 64ª which is fastened to the end wall of housing 59 and encloses another part of the mechanism for adjusting the pump.

Since the mechanism within and carried by cap 64ª is substantially the same as the corresponding mechanism within and carried by cap 64, a description thereof is deemed unnecessary for the reason that like parts have been indicated by like reference numerals with the exponent "a" added to the reference numerals applied to the mechanism within and carried by cap 64ª. It is deemed sufficient to state herein that pinion 65ª is adapted to engage the end of housing 59 and thereby function as a stop for limiting the distance that piston 53 can move slide block 45 toward the left beyond its neutral position, that abutment 70ª is adapted to engage screw 69ª and thereby limit the maximum distance that slide block 45 can be moved toward the right beyond its neutral position, and that both of these distances can be varied by rotating shaft 67ª and adjusting screw 69ª.

Liquid for energizing the several servo-motors and for supercharging pump P1 is supplied by a gear pump P2 which in practice is driven in unison with pump P1 and is arranged within the case thereof but which has been shown separate therefrom in order to simplify the drawing.

Pump P2 draws liquid from reservoir 34 and discharges it into a branched supply channel 75 one branch of which is connected to the inlet of a resistance valve 76 having the outlet thereof connected by a channel 77 to a relief valve 78 which discharges into reservoir 34. The liquid discharged by pump P2 is in excess of that required to supercharge pump P1 and to operate the several servo-motors, and the excess liquid is exhausted through relief valve 78 into reservoir 34. Relief valve 78 offers a low resistance to the flow of liquid therethrough and resistance valve 76 offers a higher resistance to the flow of liquid therethrough to thereby enable pump P2 to maintain in channel 77 a low pressure, such as 30 p. s. i., for supercharging pump P1 and to maintain in supply channel 75 a higher pressure, such as 180 p. s. i., for operating the servo-motors.

Channel 77 is connected intermediate its ends by a branched channel 79 to the inlets of two check valves 80 and 81 the outlets of which are connected, respectively, by two channels 82 and 83 to the two ports of pump P1. Check valves 80 and 81 prevent any flow of liquid from P1 into channel 77 but permit liquid to flow freely from channel 77 to whichever of the two ports of pump P1 is the intake port to thereby supercharge pump P1 at the pressure determined by relief valve 78, such as 30 p. s. i.

The flow of liquid to and from pressure chambers 50 and 51 is controlled by a valve 84 which is operated by two solenoids S1 and S2. Valve 84 has four annular grooves or ports 85, 86, 87 and 88 formed in its body and controlled by a valve member or plunger 89 which is connected to solenoids S1 and S2 and normally is held in its central or neutral position by two springs 90 and 91.

Port 85 has a branch of supply channel 75 connected thereto. Port 88 is connected by a channel 92 to channel 77 intermediate the ends thereof. Port 86 is connected to chamber 50 by a channel 93. Port 87 is connected to pressure chamber 51 by a channel 94 having a choke 95 and a check valve 96 connected therein in parallel with each other. Choke 95 limits the rate at which liquid can flow to chamber 51 so that piston 47 can move slide block 45 toward the right only at a limited rate but check valve 96 permits liquid to be freely ejected from chamber 51 into valve 84 so that slide block 45 can be moved rapidly toward the left.

The flow of liquid to and from pressure chamber 52 is controlled by valve 97 which is operated by a solenoid S3. Valve 97 has three annular grooves or ports 98, 99 and 100 formed in its body and controlled by a valve member or plunger 101 which is connected to solenoid S3 and is normally held in its neutral position by a spring 102. Port 98 has a branch of supply channel 75 connected thereto, port 99 is connected by a channel 103 to chamber 52 and port 100 is connected to drain.

The flow of liquid to and from pressure chamber 57 is controlled by a valve 104 which is operated by a solenoid S4. Valve 104 has three annular grooves or ports 105, 106 and 107 formed in its body and controlled by a valve member or plunger 108 which is connected to solenoid S4 and is normally held in its neutral position by a spring 109. Port 105 has a branch of supply channel 75 connected thereto, port 106 is connected by a channel 110 to chamber 57 and port 107 is connected to drain.

Pressure chamber 56 is continuously supplied with liquid at gear pump pressure through a channel 111 which has been shown as being connected through a choke 112 and a check valve 113 to a branch of supply channel 75. Choke 112 limits the rate at which liquid can flow to chamber 56 so that piston 53 can move slide block 45 toward the left only at a limited rate but check valve 113 permits liquid to be freely ejected from chamber 56 into channel 75 so that slide block 45 can be moved rapidly toward the right.

Chokes 95 and 112 and check valves 96 and 113 are employed only under certain conditions, such as when pump P1 is employed to energize sequentially a plurality of hydraulic motors having greatly different volumetric capacities, but under certain other conditions those chokes and check valves are omitted.

It has previously been explained that an operating pressure, such as 180 p. s. i., is continuously maintained in pressure chamber 56. When all of the solenoids are de-energized so that the plungers of the control valves are in the positions shown in Fig. 1, operating pressure will also be maintained in chamber 50 through valve 84, supercharging pressure will be maintained in chamber 51 through valve 84, and chambers 52 and 57 will be open to drain through valves 97 and 104 respectively.

If slide block 45 is at the left of neutral when the solenoids are deenergized, the operating pressure in chamber 50 will cause piston 46 to move slide block 45 toward the right until stop nut 62 engages the end of housing 58, at which time slide block 45 will be in its neutral position, and the pressure in chamber 56 will prevent slide block 45 from moving beyond its neutral position. If slide block 45 is at the right of neutral when the solenoids are deenergized, the pressure in chamber 56 will cause piston 53 to move slide block 45 toward the left into its neutral position and the pressure in chamber 50 will prevent it from being moved beyond its neutral position.

When only solenoid S1 is energized, it will move plunger 89 of valve 84 to the position shown in Fig. 3, supercharging pressure will be maintained in chambers 50 and 51 through valve 84 which will permit the operating pressure in chamber 56 to cause piston 53 to move slide block 45 toward the left until stop pinion 65ᵃ engages the end of housing 59, thereby causing pump P1 to discharge liquid into channel 35ᵃ at an intermediate rate as determined by the adjustment of pinion 65ᵃ. The supercharging pressure in chambers 50 and 51 will prevent slide block 45 from moving toward the left beyond its intermediate position as determined by the adjustment of pinion 65ᵃ.

When solenoid S4 is energized after or at the same time that solenoid S1 is energized, it will shift the plunger 108 of valve 104 to the position shown in Fig. 6 which will permit liquid at operating pressure to enter chamber 57 and cause piston 54 to move slide block 45 toward the left until abutment 70 engages adjusting screw 69, thereby causing pump P1 to discharge liquid into channel 35ᵃ at a fast rate as determined by the adjustment of screw 69.

If solenoid S4 is deenergized when pump P1 is discharging liquid into channel 35ᵃ at the fast rate, spring 109 will shift plunger 108 of valve 104 to the position shown in Fig. 1 to connect chamber 57 to drain and permit the supercharging pressure in chambers 50 and 51 to cause pistons 46 and 47 to move slide block 45 toward the right into its intermediate position as determined by the adjustment of pinion 65ᵃ. When a pump is discharging liquid under pressure, the horizontal components of the pumping forces tend to move the displacement varying member or slide block toward its neutral position. Consequently, pistons 46 and 47 are assisted by the horizontal components of the pumping forces in moving slide block 45 into its intermediate position.

When solenoid S2 is energized, it will move plunger 89 of valve 84 to the position shown in Fig. 4, operating pressure will be maintained in chambers 50 and 51 through valve 84 which will cause piston 47 to move slide block 45 toward the right until stop pinion 65 engages stop nut 62, thereby causing pump P1 to discharge liquid into channel 35 at an intermediate rate as determined by the adjustment of pinion 65. The operating pressure in chamber 56 will prevent slide block 45 from moving toward the right beyond its intermediate position as determined by the adjustment of pinion 65.

When solenoid S3 is energized after or at the same time that solenoid S2 is energized, it will shift plunger 101 of valve 97 to the position shown in Fig. 5 which will permit liquid at operating pressure to enter chamber 52 and cause piston 48 to move slide block 45 toward the right until abutment 70ᵃ engages adjusting screw 69ᵃ, thereby causing pump P1 to discharge liquid into channel 35 at a fast rate as determined by the adjustment of screw 69ᵃ.

If solenoid S3 is deenergized when pump P1 is discharging liquid into channel 35 at the fast rate, spring 102 will shift plunger 101 of valve 97 to the position shown in Fig. 1 to connect chamber 52 to drain and permit the operating pressure in chamber 56 to cause piston 53 to move slide block 45 toward the left into its intermediate position as determined by the adjustment of pinion 65. Piston 53 is assisted by the horizontal components of the pumping forces in moving slide block 45 to its intermediate position.

The control has been illustrated and described herein as applied to a particular pump but it is to be understood that the control may be applied to other hydrodynamic machines and that it may be modified in various ways without departing from the scope of the invention which is hereby claimed as follows:

1. In a pump, the combination of a member shiftable to and from a neutral position to vary pump displacement, means for urging said displacement varying member to and yieldingly holding it in said neutral position, a first servo-motor for moving said member in one direction to a first position a predetermined distance beyond said neutral position, a second servo-motor for moving said member in the same direction to a second position beyond said first position, a first positive stop for causing said member to stop in said first position when it is moved thereto by said first servo-motor, a second positive stop for causing said member to stop in said second position when it is moved thereto by said second servo-motor, means for supplying motive liquid to said servo-motors to energize the same including valve means for controlling the flow of liquid to and from said servo-motors selectively, and means for operating said valve means to effect selective operation of said servomotors.

2. A control as set forth in claim 1 including casing means for enclosing said stops, and means operable from outside said casing means for adjusting said first stop to thereby vary the position to which said first servo-motor can move said member.

3. A control according to claim 2 in which said first servo-motor includes a piston, said first stop includes a normally stationary abutment, a control rod movable with said piston and a pinion threaded upon said control rod and adapted to engage said abutment to thereby limit the distance said piston can move, and in which said stop adjusting means includes a gear for rotating said pinion to move it along said rod and thereby vary the distance said piston can move and a shaft fixed to said gear and extending through said casing means for operation from the outside thereof.

4. A control according to claim 1 in which said first stop limits the movement of said first servo-motor to thereby prevent it from moving said member beyond said first position and said urging means prevents said member from moving beyond the position to which it is moved by said first servo-motor.

5. In a pump, the combination of a member shiftable to and from a neutral position to vary pump displacement, a first servo-motor for moving said member in one direction to a first position a predetermined distance beyond said neutral position, a first positive stop for causing said member to stop in said first position when it is moved thereto by said first servo-motor, a second servo-motor for moving said member in the same direction to a second position beyond said first position, a second positive stop for causing said member to stop in said second position when it is moved thereto by said second servo-motor, a third servo-motor for moving said member in the opposite direction after it has been moved in said one direction by said first servo-motor, a third positive stop for preventing said third servo-motor from moving said member farther after it has moved said member into said neutral position, means for supplying motive liquid to said servo-motors to energize the same including valve means for controlling the flow of liquid to and from said servo-motors selectively, and means for operating said valve means to effect selective operation of said servo-motors.

6. A control as set forth in claim 5 including casing means for enclosing said stops, and means operable from outside said casing means for adjusting said first stop to thereby vary the position to which said first servo-motor can move said member.

7. A control according to claim 6 in which said first servo-motor includes a piston, said first stop includes a normally stationary abutment, a control rod movable with said piston and a pinion threaded upon said control rod and adapted to engage said abutment to thereby limit the distance said piston can move, and in which said stop adjusting means includes a gear for rotating said pinion to move it along said rod and thereby vary the distance said piston can move and a shaft fixed to said gear and extending through said casing means for operation from the outside thereof.

8. A control according to claim 5 in which said third servo-motor includes a piston and is larger than said first and second servo-motors, said third stop acts upon said piston, and said liquid supply means supplies liquid to said first and third servo-motors simultaneously to enable said third servo-motor to move said member to said neutral position and to enable said first servo-motor to prevent said member from moving beyond said neutral position.

9. In a pump, the combination of a member shiftable to and from a neutral position to vary pump displacement, a first servo-motor for moving said member in one direction to a first position a predetermined distance beyond said neutral position, a first positive stop for causing said member to stop in said first position when it is moved thereto by said first servo-motor, a second servo-motor for moving said member in the same direction to a second position beyond said first position, a second positive stop for causing said member to stop in said second position when it is moved thereto by said second servo-motor, a third servo-motor for moving said member in the opposite direction after it has been moved in said one direction by said first servo-motor, a third positive stop for preventing said third servo-motor from moving said member farther after it has moved said member into said neutral position, a fourth servo-motor for moving said member in said opposite direction to a third position a predetermined distance beyond said neutral position, a fourth positive stop for preventing said fourth servo-motor from moving said member beyond said third position, means for supplying motive liquid to said servo-motors to energize the same including valve means for controlling the flow of liquid to and from said servo-motors selectively, and means for operating said valve means to effect selective operation of said servo-motors.

10. A control according to claim 9 including casing means for enclosing said stops, and separate means operable from outside said casing means for adjusting each of said first, second and fourth stops to thereby vary the position to which each of said first, second and fourth servo-motors can move said member.

11. A control according to claim 10 in which said first servo-motor includes a piston, said first stop includes a normally stationary abutment, a control rod movable with said piston and a pinion threaded upon said control rod and adapted to engage said abutment to thereby limit the distance said piston can move, and in which said stop adjusting means includes a gear for rotating said pinion to move it along said rod and thereby vary the distance said piston can move and a shaft fixed to said gear and extending through said casing means for operation from the outside thereof, and said fourth stop and the adjusting means therefor are substantially the same, respectively, as said first stop and the adjusting means therefor.

12. A control according to claim 9 including a fifth servo-motor for moving said member to a fourth position a predetermined distance beyond said third position and a fifth positive stop for preventing said fifth servo-motor from moving said member beyond said fourth position.

13. A control according to claim 9 in which said first and second servo-motors are small and said third and fourth servo-motors are large and which includes a source of liquid at an operating pressure, a source of liquid at a much lower pressure, means for continuously supplying liquid from said operating pressure source to one of said small servo-motors, means for supplying liquid from said operating pressure source to all of the other servo-motors and for supplying liquid from said lower pressure source to at least one of said large servo-motors including valve means for controlling the flow of liquid to and from said other servo-motors and adapted to connect said other servo-motors to said operating pressure source selectively and to connect at least one of said large servo-motors to said operating pressure source and to said lower pressure source alternatively, and means for operating said valve means to effect selective operation of said servo-motors.

14. In a pump, the combination of a member shiftable to and from a neutral position to vary pump displacement, a plurality of small servo-motors for moving said member in one direction, a plurality of large servo-motors for moving said member in the opposite direction, a plurality of stops one for each of said servo-motors to prevent each servo-motor from moving said member beyond a predetermined position, a source of liquid at an operating pressure, a source of liquid at a much lower pressure, means for continuously supplying liquid from said operating pressure source to one of said small servo-motors, means for supplying liquid from said operating pressure source to all of the other servo-motors and for supplying liquid from said lower pressure source to at least one of said large servo-motors including valve means for controlling the flow of liquid to and from said other servo-motors and adapted to connect said other servo-motors to said operating pressure source selectively and to connect at least one of said large servo-motors to said operating pressure source and to said lower pressure source alternatively, and means for operating said valve means to effect selective operation of said servo-motors.

15. A control according to claim 14 including casing means for enclosing said stops, and separate means operable from outside said casing means for adjusting said stops to thereby vary the positions to which said servo-motors can move said member.

16. In a pump, the combination of a member shiftable in opposite directions from a neutral position to vary pump displacement and thereby vary between zero and a predetermined maximum the rate at which said pump discharges liquid, a first large servo-motor adapted when effective to move said member in one direction to said neutral position, a second and a third large servo-motor adapted when one or the other is effective to move said member in said one direction to one or the other of two predetermined positions beyond said neutral position, a source of operating liquid, a small servo-motor continuously supplied with liquid from said source for moving said member in the opposite direction, means including valve means for supplying liquid from said source to said large servo-motors selectively and normally connecting only said first servo-motor to said source, means for operating said valve means to direct operating liquid to said second large servo-motor to thereby cause said pump to discharge liquid in one direction at one rate, means for operating said valve means to direct liquid to said third large servo-motor to thereby cause said pump to deliver liquid in the same direction at a different rate and means for operating said valve means to render said large servo-motors ineffective and enable said small servo-motor to move said member in the opposite direction beyond said neutral position to thereby reverse said pump.

References Cited in the file of this patent

UNITED STATES PATENTS

| | | |
|---|---|---|
| 1,952,663 | Ernst | Mar. 27, 1934 |
| 2,239,882 | Davis | Apr. 29, 1941 |
| 2,273,721 | Muller | Feb. 17, 1942 |
| 2,274,226 | Wiedmann | Feb. 24, 1942 |
| 2,280,190 | Ernst | Apr. 21, 1942 |
| 2,295,780 | Ernst | Sept. 15, 1942 |
| 2,298,358 | Ernst | Oct. 13, 1942 |
| 2,372,825 | Grad | Apr. 3, 1945 |